(12) United States Patent
Mihaila et al.

(10) Patent No.: US 7,499,927 B2
(45) Date of Patent: Mar. 3, 2009

(54) TECHNIQUES FOR IMPROVING MEMORY ACCESS PATTERNS IN TREE-BASED DATA INDEX STRUCTURES

(75) Inventors: George Andrei Mihaila, Yorktown Heights, NY (US); Ioana Roxana Stanoi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/065,024

(22) Filed: Feb. 24, 2005

(65) Prior Publication Data
US 2006/0190468 A1 Aug. 24, 2006

(51) Int. Cl.
*G06F 7/00* (2006.01)
*G06F 17/00* (2006.01)
(52) U.S. Cl. .............................. 707/100; 707/1; 711/152
(58) Field of Classification Search ....................... 707/1, 707/100; 711/152
See application file for complete search history.

(56) References Cited

U.S. PATENT DOCUMENTS

| | | | | |
|---|---|---|---|---|
| 5,857,198 | A * | 1/1999 | Schmidt .................. | 707/103 R |
| 6,233,574 | B1 * | 5/2001 | Ladwig et al. ................. | 707/4 |
| 6,421,662 | B1 * | 7/2002 | Karten ........................... | 707/3 |
| 6,427,147 | B1 * | 7/2002 | Marquis ........................ | 707/4 |
| 2003/0126116 | A1 * | 7/2003 | Chen et al. ..................... | 707/3 |
| 2004/0107186 | A1 * | 6/2004 | Najork et al. .................. | 707/3 |

OTHER PUBLICATIONS

Gupta et al., "Tree based MPLS routing", ACM, Proceedings of the fifteenth annual ACM symposium on Parallel algorithms and architectures, 2003, pp. 193-199. downloaded: http://delivery.acm.org/10.1145/780000777443/p193-gupta.pdf?key1=777443 &key2=0968043221&coll=ACM&dl=ACM&CFID=5344279 &CFTOKEN=15532916.*
Rao, J. et al., "Cache Conscious Indexing for Decision-Support in Main Memory", VLDB 1999, pp. 1-12.
Rao, J. et al., "Making B+-Trees Cache Conscious in Main Memory", SIGMOD Conference 2000, 12 pgs.
Chen, S. et al., Fractal Prefetching b+-Trees: Optimizing Both Cache and Disk Performance, SIGMOD Conference 2002, 12 pgs.

* cited by examiner

*Primary Examiner*—Jean Bolte Fleurantin
*Assistant Examiner*—Jami Hares
(74) *Attorney, Agent, or Firm*—Harrington & Smith PC (57) ABSTRACT

A computer-implemented method is provided for performing key lookups. The method comprises accessing a header of a given one of a plurality of nodes in a tree-based data index structure. The given node comprises the header and a plurality of partitions. Each partition comprises at least one key. The header of the given node comprises a selected key from each of a selected plurality of the partitions. The method also comprises choosing, using a search key, a selected key in the header. The method further comprises accessing a partition corresponding to the chosen selected key and selecting, using the search key, one of the at least one keys in the accessed partition. The selected one of the at least one keys can be used to access another of the plurality of nodes. Yet additional methods, apparatus, and program products are disclosed.

13 Claims, 7 Drawing Sheets

FIG.7

TECHNIQUES FOR IMPROVING MEMORY ACCESS PATTERNS IN TREE-BASED DATA INDEX STRUCTURES

TECHNICAL FIELD

This invention relates generally to computer systems and, more specifically, relates to database access using computer systems.

BACKGROUND OF THE INVENTION

Many current database management systems (DBMSs) are designed under the assumption that the entire database is stored on disk, and only a small working data set fits in main memory. During query processing, data is often fetched from disk and brought into the in-memory working space, residing in main memory. Since in this model the disk input/output (I/O) is a major bottleneck, numerous optimizations have been proposed for its reduction.

The assumption that the major bottleneck is disk I/O holds today in systems where the main memory size is relatively small by comparison to the database size. As random access memory is becoming cheaper, however, computers are being built with increasing memory sizes. A result is that many DBMSs today have large enough main memory to contain low-end (e.g., relatively small) databases entirely.

During query processing, data is fetched in blocks and brought from main memory into a cache, typically a processor-resident cache. The size of a block, referred to as a cache line, usually varies depending on processor or system implementation in size between 32, 64, and 128 bytes. When a data item needs to be accessed, the processor first looks into its local cache. If the entry is not there, a cache miss occurs and the item is fetched from main memory.

Caches today are classified by "levels." Typically, computer systems have multiple cache levels, such as L1, L2, and L3. Each level is designated as such by the order in which a processor will access the level (e.g., a processor will access an L1 cache prior to an L2 cache). Originally, only L1 caches resided on the semiconductor chip on which the processor was formed. However, today L2 caches also generally reside on the same semiconductor chip as the processor.

It has been shown that in commercial databases a significant component of the data access cost is the cost of fetching data into processor-resident L2 caches due to cache misses. The Pentium 4 processor, for example, spends as many as 150 clockticks to fetch an entry into the L2 cache while an instruction takes by definition one clocktick. Similarly to traditional databases where optimizations are made to reduce disk accesses, performance gain for in-memory databases can be achieved by reducing the number of cache requests from memory. By contrast, if a database resides mostly on disk the benefit of reducing cache misses is generally overshadowed by the relatively high cost of disk accesses.

A DBMS component that significantly impacts the performance of queries is the data index. The purpose of a data index is to facilitate efficient access to data items in records of the database. In the case of in-memory databases, the cost of index traversal is dependent on the number of cache lines fetched from memory.

Recently, a number of projects focused on the implementation of tree-based structures for in-memory data indexes that can perform well in main memory. In such tree-based data index structures, a tree is traversed, e.g., from a root node, through intermediate nodes, and to a leaf node containing a pointer to a record. Each node typically comprises keys that contain pointers to other nodes (e.g., root and intermediate nodes) or pointers to records (e.g., leaf nodes). The tree-based data index structure is searched in key lookups until a match is (e.g., or is not) found between a search key and a key in a leaf node. The leaf node points to a record containing information corresponding to the search key.

The cost of in-memory data retrieval depends on the height of the tree as well as the cost of key lookups in the nodes. By contrast, for disk-based accesses, the latter cost component was considered negligible. Most proposals for in-memory data indexes concentrate on reducing the cost of key searches in a node. There are a variety of proposed in-memory data indexes, but these proposed in-memory data indexes and the use thereof still could be improved.

BRIEF SUMMARY OF THE INVENTION

The present invention provides techniques for improving memory access patterns in tree-based data index structures.

For instance, techniques are provided for performing key lookups. One exemplary technique includes accessing a header of a given one of a number of nodes in a tree-based data index structure. The given node includes the header and a number of partitions. Each partition includes one or more keys. The header of the given node includes a selected key from each of a selected number of the partitions. Using a search key, a selected key is chosen in the header. A partition corresponding to the chosen selected key is accessed. Using the search key, one of the keys is selected in the accessed partition. The selected key can be used to access another of the nodes in the tree-based data index structure.

It can be shown that fewer cache accesses are made, as compared to particular conventional tree-based data index structures having certain types of nodes, when performing key lookups on a tree-based data index structure that is stored in main memory and has one or more nodes that contain a header including a selected key from each of a selected number of the partitions of one of the nodes. Typically, each node in the tree-based data index structure would comprise a header, but headers although beneficial are not required for all nodes.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

For ease of reference, the present disclosure is divided into an Introduction section, an Exemplary HB+-Trees and Techniques for Performing Key Lookups Therewith section, and an Exemplary Results section.

1. Introduction

Tree-based data index structures designed to support efficient disk accesses perform data searches (e.g., key lookups) in time proportional to the height of the tree. One of the most widely used tree-based data index structures is the B+-tree. In the B+-tree, each node is typically stored in pages of 4K (where K=1024), 16K, or 32K main memory locations. Since disk accesses are much more costly than cache misses, the total cost is proportional to the number of nodes traversed (e.g., defined by the height of the tree). For this reason, B+-trees usually are short: for example a B+-tree with height of three and a branching factor of 1000 can store a billion keys but requires at most three disk accesses.

Assume now that the same index structure is used for an in-memory database. Data is fetched from memory in cache lines that are small in comparison to the node size and each search within a node incurs several memory fetches. The cost of data accesses is now proportional both to the number of nodes visited and to the traversal cost of a node.

Figure 1:
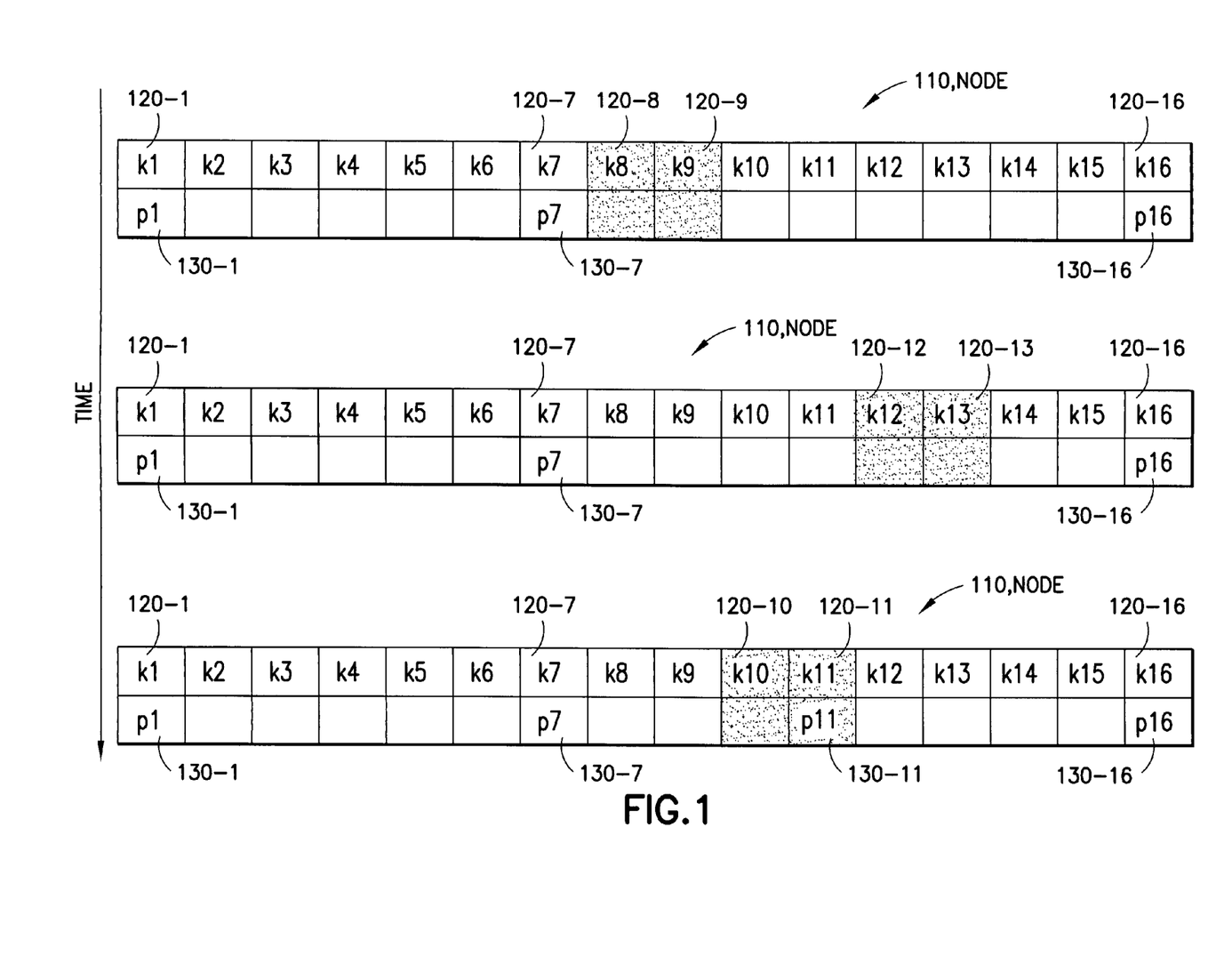
FIG. 1 illustrates typical cache behavior over time for key lookup in a B+-tree.

Consider the simplified example in FIG. 1, where a node 110 contains 16 keys 120-1 through 120-16 and 16 pointers 130-1 through 130-16, and where a cache line (not shown in FIG. 1) can only fit two keys 120. It should be noted that the pointers 130 are also brought into the cache. During a binary search for key k11 120-11 that is equivalent to a provided search key (not shown in FIG. 1). The middle point, key k8 120-8 is first compared with the search key to determine that the search key is in the second half of the range. Another midpoint is chosen, key k12 120-12, and the search key is now in the left half of the new range. The key k11 120-11 is found following two more iterations: the search key is compared with k10 and then with k11. Note that k11 has a pointer p11 130-11, which points, e.g., to another node or to a database record.

Consider the effect of cache line size on the performance of the search. In order to compare the search key with key k8 120-8, the cache line starting at k8 is brought into the cache (not shown in FIG. 1). Key k9 120-9, is brought in the cache but not used in the computation. The next cache line fetched contains key k12 120-12, where key k13 120-13 is also brought in the cache. When key k10 120-10 is accessed, another cache line is fetched, which also contains key k11 120-11. One can see that, in terms of the number of memory fetches, this index design is inefficient.

Several opportunities for improvement were explored recently, and the underlying trends are to fit in a cache line as much useful information as possible, or to reduce the node size and implicitly the search iterations. Analysis of B+-trees showed that the most efficient version is the tall B+-tree, where the node size corresponds to a cache line size. In this model, the number of cache lines fetched during a tree traversal is equal to the number of nodes accessed (e.g., defined by the height of the tree). A relative of the B+-tree, the T-tree, stores both pointers and actual data in the nodes. However, the T-tree was shown to be less efficient than the tall B+-tree.

The work of Shimin Chen, Phillip B. Gibbons, Todd C. Mowry, Gary Valentin, "Fractal Prefetching B+-Trees: Optimizing Both Cache and Disk Performance, SIGMOD Conference 2002, pp. 157-168, considers the scenario where the index is restricted to nodes of disk page size. The fan-out n of each node and therefore the height of the tree depend on the size of disk pages. To reduce the number of cache lines fetched during the traversal of each node, nodes in Fractal trees are organized in mini-trees themselves. Such an internal tree again has nodes of size equal to the cache line size. Binary search in a node is thus replaced by the internal traversal of the mini-tree, and the number of cache lines fetched is reduced from $\lceil \log_2 n \rceil$ to $\lceil \log_c n \rceil$, where c is the size of a cache line in terms of the number of keys that can fit in the cache line. The fractal tree resembles in execution the tall B+-tree, but the fractal tree maintains the pagination requirements of disk-based databases.

Another method to reduce the number of cache line fetches was proposed by Rao and Ross for the CSS-tree and later the CSB+-tree. See, respectively, Jun Rao, Kenneth A. Ross, "Making B+-Trees Cache Conscious in Main Memory," SIGMOD Conference 2000, pp. 475-486 and Jun Rao, Kenneth A. Ross, "Cache Conscious Indexing for Decision-Support in Main Memory, VLDB 1999, pp. 78-89. The idea is to store as many keys as possible close together by eliminating most pointers in the node structure. Recall that in a typical B+-tree implementation, nodes store keys as well as pointers to direct the search further from a node to one of its children. In the CSB+-tree, all children of a node are grouped and only one pointer to the beginning of the group is maintained. The pointers to the individual nodes in the group are eliminated and access to those nodes is based on their offset relative to the beginning of the group.

The query performance of databases is largely dependent on the performance of indexing structures used to access the database. In particular, indexes of in-memory databases attempt to reduce the more significant overhead of memory accesses. As shown, advantage can be gained by reducing the most significant overhead: memory accesses. In the next section, the HB+-tree is introduced. The HB+-tree surpasses in performance all tree-based indexes discussed in this section.

2. Exemplary HB+-Trees and Techniques for Performing Key Lookups therewith

In this section, exemplary HB+-trees, tree-based data index structures, are introduced. The use, construction, and maintenance of the HB+-tree is described after an observation is discussed.

2.1 Observation

Returning to FIG. 1, recall that a B+-tree node (e.g., node 110 of FIG. 1) comprises a non-decreasing sequence of keys 120 interleaved with pointers 130 to child subtrees. Every pointer 130 that is between two keys $k_i$ and $k_{i+1}$ represents the address of a subtree that contains keys greater than or equal to $k_i$ and less than $k_{i+1}$. To search for a key, the tree-based data index structure of the B+-tree is traversed starting from the root. The next node to be visited is a "root" of the subtree that is determined to contain the key 120. That is, the pointer followed is between $k_i$ and $k_{i+1}$ such that the search key is greater or equal to $k_i$ and less than $k_{i+1}$. By construction, nodes are guaranteed to be never less than half full. The larger the fan out (e.g., number of pointers) of nodes, the shorter is the height of the B+-tree. This feature explains the advantage that the B+-tree offers for searches. If data including the index pages is on disk, then the number of disk accesses for index traversal is equal to the height of the tree.

Figure 2:
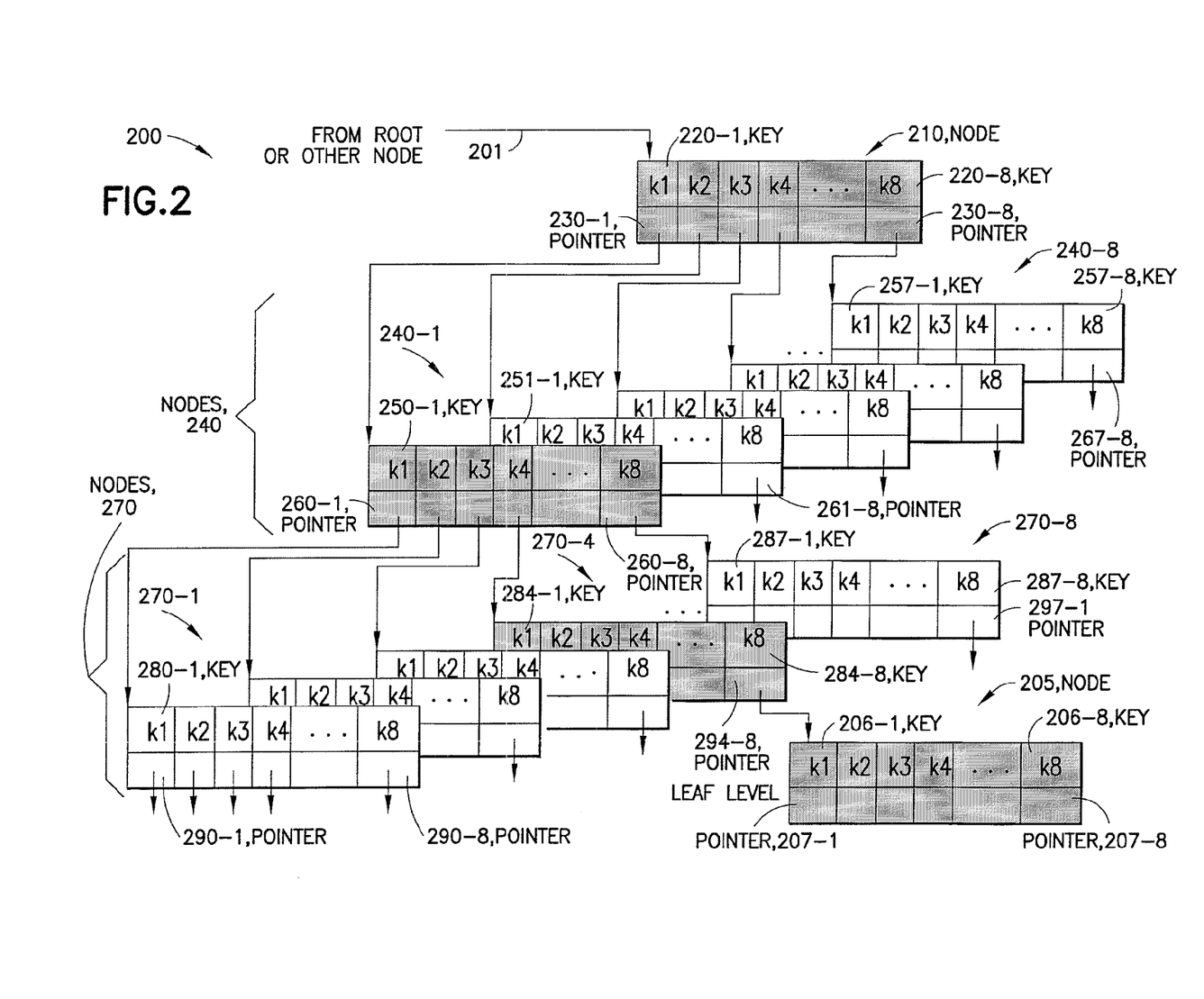
FIG. 2 illustrates a portion of a search path during key lookup in Tall B+-tree for eight keys in a cache line.

Turning to FIG. 2, a portion 200 of a tall B+-tree 200 is shown. A pointer 201 to the node 210 is used to access the node 210. The node 210 comprises eight keys 220-1 through 220-8, each associated with a respective pointer 230-1 through 230-8. Each of the pointers 230 references a node 240 (e.g., nodes 240-1 through 240-8). Each of the nodes 240 comprises keys and associated pointers. For instance, node 240-1 comprises keys 250-1 through 250-8 and pointers 260-1 through 260-8; node 240-2 comprises keys 251-1 through 251-8 and pointers 261-1 through 261-8; and node 240-8 comprises keys 257-1 through 257-8 and pointers 267-1 through 267-8. Each of the pointers 260 point to nodes 270 (e.g., node 270-1 through node 270-8). Each of the nodes 270 comprises keys and associated pointers. For instance, node 270-1 comprises keys 280-1 through 280-8 and pointers 290-1 through 290-8; node 270-4 comprises keys 284-1 through 284-8 and pointers 294-1 through 294-8; and node 270-8 comprises keys 287-1 through 287-8 and pointers 297-1 through 297-8. The pointer 294-8 points to a leaf-level node 205, which comprises keys 206-1 through 206-8 and associated pointers 207-1 through 207-8. Each of the pointers 207 points to records in a database. A record is any accessible portion of a database.

FIG. 2 illustrates an exemplary access pattern for one key lookup in a tall B+-tree. The dark nodes (i.e., nodes 210, 240-1, 270-4, and 205) represent the accessed nodes. The size of a node 210, 240, 270, 205 in the tall B+-tree is equal to the cache line size. The node fan-out is in this example therefore n=L/(2*4) keys, where L is the size of a cache line, keys and pointers are each stored in four bytes, and a node has the same number of keys and pointers. The simplifying assumption was made that there is an equal number of keys and pointers; in fact the value of the first key in a node is generally not stored since the value for the key can be inferred. In order to store $n^2$ keys, the tall B+-tree will have two levels if the nodes are all full. Since during search one cache line has to be accessed for each level, it means that in order to process $n^2$ keys, the processor (not shown in FIG. 2) will fetch two cache lines from memory. For any number of keys between $n^2+1$ and $n^3$, the height of the tree increases to three. That is, traversal of the tree will now incur the cost of three cache line fetches. A tall B+-tree that stores a given number of keys will always incur exactly the same number of fetched cache lines, independently of which key is searched.

Now consider a wide B+-tree with node fan-out of $n^2+1$. It has been shown by the evaluation of the Fractal tree that the most efficient access to the node entries is by traversing an internal mini-tree. The nodes of this internal tree are again the size of a cache line. Then, in order to access any of the keys in the node, the processor traverses exactly three levels of the internal tree. Again, the number of nodes visited coincides with the memory fetches necessary for index traversal.

By contrast, proposed herein is, in an exemplary embodiment, a tree-based data index structure whose nodes store $4n^2$ keys and there are either two or three cache lines accessed for the retrieval of one entry. The number of necessary memory fetches varies according to the location of the searched key. In fact, it can be shown that the average over all node searches corresponds to 2.5 fetches. This variation leads to the performance advantage of the HB+-tree over other tree-based data index structures.

2.2 Construction and Search of an Exemplary HB+-tree

Figure 3:
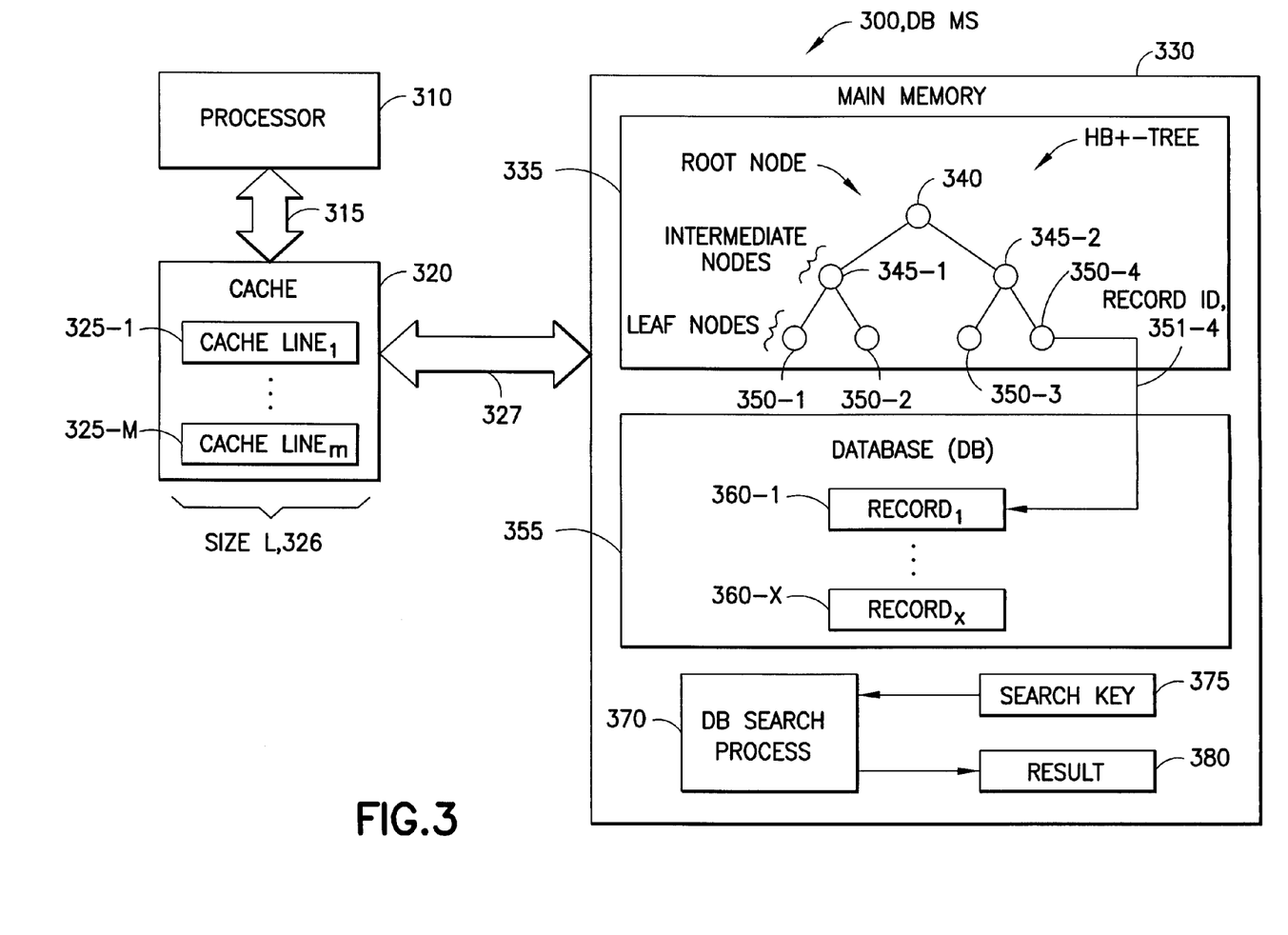
FIG. 3 is a block diagram of an exemplary DBMS suitable for implementing an exemplary embodiment of the present invention;.

Before proceeding with construction of an exemplary HB+-tree, an exemplary database management system (DBMS) will be described that is suitable for implementing the present invention. Referring now to FIG. 3, a DBMS 300 is shown. DBMS 300 comprises a processor 310, a data bus 315, a cache 320, a data bus 327, and a main memory 330. The cache 320 comprises cache lines 325-1 through 325-M, each of which has a cache line size L 326. Main memory 330 comprises an HB+-tree 335, a database 355, a database search process 370, a search key 375, and a result 380. The HB+-tree 335 comprises a number of interconnected nodes including a root node 340, two intermediate nodes 345, and four leaf nodes 350. The nodes are interconnected through pointers, as described in more detail below. Each leaf node 350 has a pointer to a record 360. The pointer in the example of FIG. 3 is a record identification (ID) 351, of which record ID 351-4 is shown. The database 355 comprises records 360-1 through 360-X. In the example of FIG. 3, the record 360-1 is pointed to by the record ID 351-4.

The cache 320 is a write-through cache, which is merely exemplary. Other types of caches (such as write back caches) may be used, multiple caches may be used, and the cache 320 may or may not reside on the same semiconductor chip that houses the processor 310. If desired, multiple processors 310 may be used, and multiple main memories 330 may be used. Main memory 330 is typically dynamic random access memory (DRAM). The cache 320 has faster access (e.g., read) times than does the main memory 330.

Although the present invention is most beneficial when database 355 is also stored in memory 330, as long as the HB+-tree 335 (e.g., or a portion thereof) is stored in main memory 330, a performance improvement will result.

Broadly, the database search process 370 performs a key lookup using the HB+-tree 335 to match the search key 375 with a key (shown in FIGS. 4 and 6) in the leaf nodes 350. The database search process 370 produces a result 380. The result could be, e.g., the record ID 351-4 or the data in the record 360-1.

In an exemplary embodiment, the cache line size L 326 of the cache lines 325 is used to group keys in nodes 340, 345, and 350. For instance, let n be the number of keys that fit in a node restricted to the cache line size L 326. Since the node has an equal number of keys and pointers of 4 bytes (B) each and the cache line size L 326 is 64 B, then n=8. As shown below, an exemplary advantage behind the HB+-tree 335 is that one can group together $4n^2$ keys, and guarantee (in an exemplary embodiment) three cache line accesses in the worst case and two cache line accesses in the best case.

The main memory 330 may contain a program of machine-readable instructions executable by a digital processing apparatus such as DBMS 300 to perform one or more operations described herein. A program storage device can tangibly embody the program of machine-readable instructions. A program storage device can be any device suitable for containing a program of machine-readable instructions, such as a digital versatile disk (DVD), compact disk (CD), and hard drive.

Figure 4:
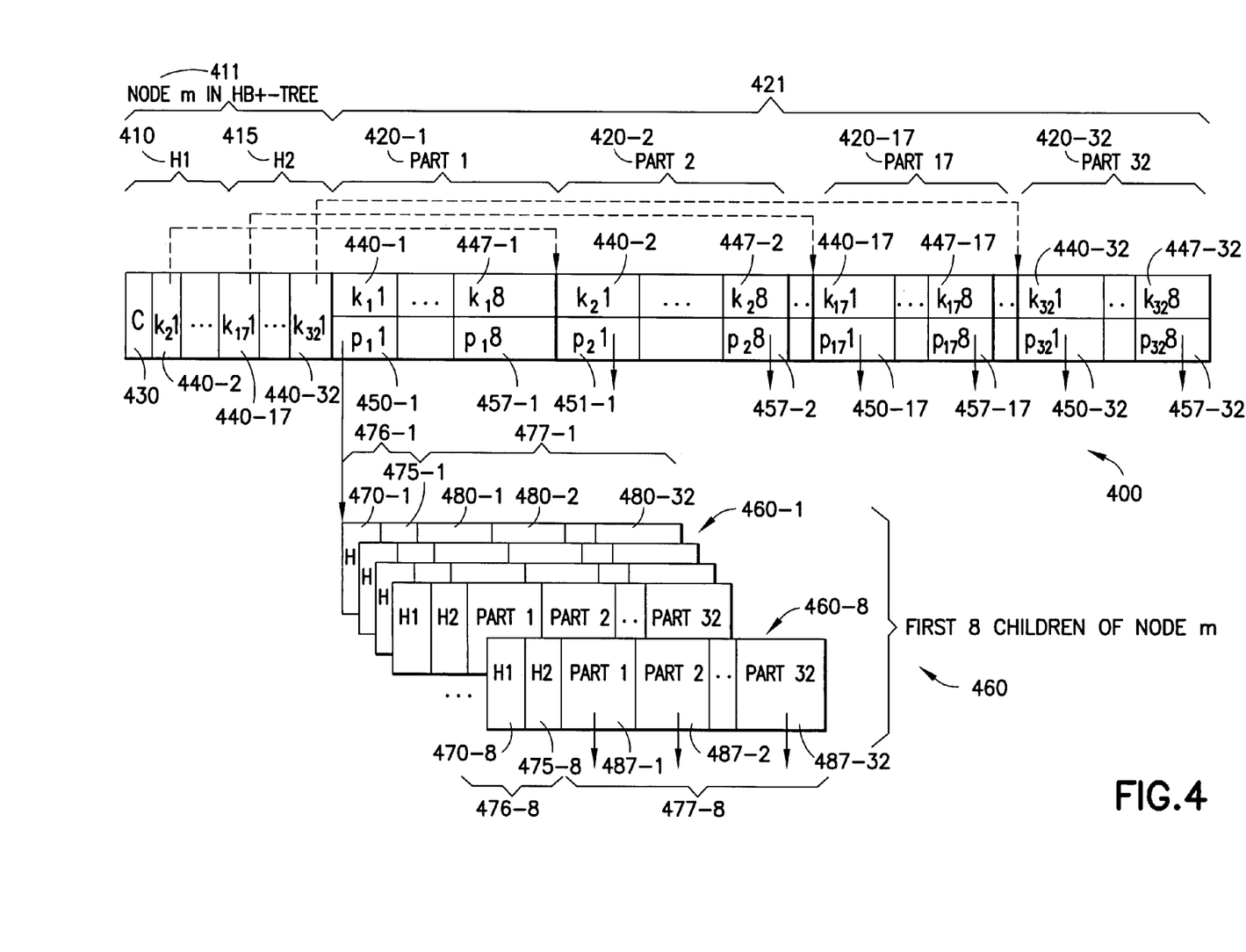
FIG. 4 is a diagram of an exemplary node, m, and the first eight children of the node m in an exemplary HB+-tree.

Turning now to FIG. 4 with appropriate reference to FIG. 3, a diagram is shown of an exemplary node, m, 400 and the first eight children nodes 460 of the node 400 in an exemplary HB+-tree 335. Typically, all nodes (e.g., of which node 400 is an example) in the HB+-tree 335 have two distinctive components: a header 411 and a main section 421. However, there could be differences between nodes (e.g., the root node 340 may be different from the intermediate nodes 345, and/or the intermediate nodes may be different from the leaf nodes 350). For simplicity, it is assumed herein that all nodes in the HB+-tree 335 are the same. The main section 421 is divided into a number of partitions 420. In this example, there are 32 partitions 420 (partitions 420-1 through 420-32). It should be noted that the header 411 and main section 421 are contiguous in main memory 330. The header 411 comprises, in this example, two header blocks H1 410 and H2 415. Header block H1 410 comprises a counter 430 and keys 440-2 through 440-32. Header block 415 comprises keys 440-17 through 440-32.

The header 411 acts, e.g., like a directory for the main section 421 of the node 400, which has the typical structure of the B+-tree node: pairs of keys and pointers to children nodes. For instance, each partition 420 comprises eight keys 440 through 447 and eight associated pointers 450 through 457. Thus, each key 440-1 through 440-32 has an associated pointer 450-1 through 450-32; each key 441-1 through 441-32 has an associated pointer 451-1 through 451-32; and each key 447-1 has an associated pointer 457-1 through 457-32.

The first eight children nodes 460 (nodes 460-1 through 460-8) are shown. Each of the children nodes 460 comprises headers 476 (headers 476-1 through 476-8) and main sections 477 (main sections 477-1 through 477-8). Each of the headers 476 comprises two header blocks H1 470 and H2 475, which are defined as shown in header blocks 410, 415. Each of the main sections 477 comprises 32 partitions. For example the main section 477-1 comprises partitions 480-1 through 480-32 and the main section 477-8 comprises partitions 487-1 through 487-32.

In the example in FIG. 4, each header (e.g., headers 411, 476) comprises two header blocks (e.g., header blocks 410 and 415 for header 411 and header blocks 470, 475 for headers 476), where each block is of the size of a cache line (e.g., cache line size L 326). For simplicity, node 400 will be discussed herein, although other nodes (e.g., nodes 460) are in an exemplary embodiment designed similarly. In node 400, the header 411 contains 4n−1 keys 440 ($k_2^1, k_3^1, k_4^1, \ldots, k_{32}^1$) and a counter 430 that keeps track of how full the main section 421 is. If one partitions the entries in the node 400 into blocks of cache line size L 326, then each key 440-2 through 440-32 in the header replicates the first key in a partition 420, where each partition 420 has a size equivalent to the cache line size L 326. For example, $k_2^1$ is the smallest key 440-2 in the partition 420-2 containing keys 440-2 through 440-7 (e.g., $k_2^1, k_2^2, \ldots, k_2^8$) in the main section 421.

Note that, similarly to the B+-tree, the keys 440-2 through 440-32 in the header as well as the keys 440-447 in the main section 421 of the node 440 are always in sorted (e.g., numeric) order. In this example, the sorted order is from smallest (key 440-1) to largest (key 447-32). The sorted order number of the key $k_i^1$ in the header 411 is the same as the order number of the corresponding partition 420 in the main section 421 of the node 400.

During the traversal of the node 400 with a search key k, a first step is to find the positioning of k with respect to the header keys 440. If the value of k is such that $k>=k_i^1$ and $k<k_{i+1}^1$ for some $k_i^1$ and $k_{i+1}^1$ in the header 411, then k must also be contained in the range described by the partition of the main section 421 that starts at $k_i^1$.

In order to store as many keys 440 as possible in the header 411, the position (e.g., indicated by reference 430) that could be occupied by the first key 440-1 (e.g., key $k_1^1$ in the main section 421) is used to store a counter, C, 430 of the number of keys 440 in the node 400. In the example of FIG. 4, the counter, C, 430 would be 32 times 8 for a value of 256. Then the first actual key 440-2, $k_2^1$, in the header 411 replicates the first key in the second partition 420-1 of the main section 421. By replacing the key 440-1, $k_1^1$, with the counter 430, no useful information was lost: if the search key is less than 440-2, $k_2^1$, then k must be contained in the range starting at $k_1^1$ in the main section 421.

Note that FIG. 4 is merely one exemplary embodiment. The node 400 may be changed in any number of ways. For example, the keys 440-447 may be sorted from highest (e.g., key 440-1) to smallest (e.g., key 447-32); and more or fewer header blocks 410, 415 could be used. Note that each partition 420 has eight positions, each position containing a key from the set of keys 440-447. In the example of FIG. 4, the keys 440-447 for the entire node are sorted in ascending order, and the first position of each of the partitions 420 is selected as the position to be used for inclusion in the header 411. However, other positions (e.g., the eighth position) in each partition 420 could be selected for inclusion in the header 411. Thus, instead of storing in the header 411 the smallest key 440 of partitions 420, the largest key 447 of partitions 420 could be stored in the header 411.

Search techniques for key lookup for the exemplary HB+-tree 335, a portion of which is shown in FIG. 4, differ from those of the B+-tree. A general description of key lookup will be given, followed by a more specific example of key lookup.

Generally, starting from the root node (e.g., root node 340 of FIG. 3), keys in the root node of the B+-tree are compared to find the pointer to the subtree that may contain the search key. The pointer is then followed to the child node (e.g., an intermediate node 345 of FIG. 330), e.g., the "root" of the new subtree, where the process is repeated. By contrast to the B+-tree search, the key lookup within the node of an HB+-tree 335 starts off with a linear search through the header (e.g., header 411 of FIG. 4). The comparison stops when the header key is greater than the search key or there are no more header keys. The previous header key is then selected, and its position in the header represents the position of the relevant part in the remaining portion of the node. The location of the matching header key then gives the location of the corresponding partition in the main section. The search for a key inside this partition is then done through a linear scan. The index traversal then follows this child pointer and the procedure is repeated until the node is a leaf node (e.g., a leaf node 350 of FIG. 3). Note that leaf nodes store record IDs (e.g., record IDs 351 of FIG. 3) instead of pointers.

Figure 5:
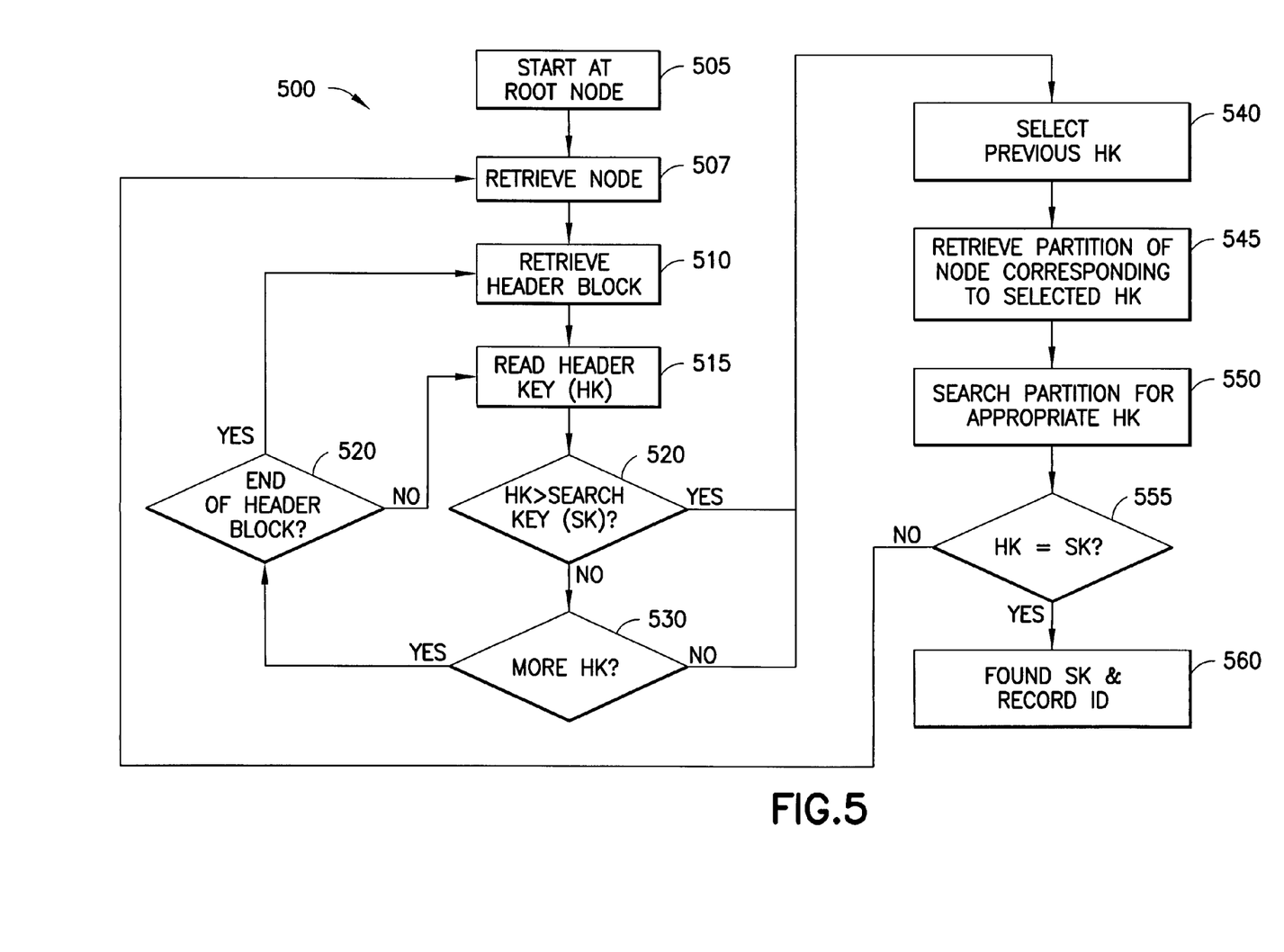
FIG. 5 is a flowchart of a method for key lookup using an HB+-tree.

More specifically, turning to FIG. 5 with appropriate reference to FIGS. 3 and 4, an exemplary method 500 is shown for key lookup using an exemplary HB+-tree 335. Method 500 starts in step 505, where the root node is selected. A node is retrieved in step 507. In step 510, one of the header blocks (e.g., header block 410) is retrieved. Steps 510, 515, 520, 525, and 530 perform a linear search through the header 411. In step 515, a header key (e.g., a key 440 in the header block 410) is read. In step 520, it is determined if the header key is greater than the search key. If not (step 520=NO), in step 530, it is determined if there are more header keys. Note that in an exemplary embodiment, it can be determined if there are more header keys by comparing the counter 430, C, with the number of keys 440 retrieved from the header 411. If there are no more header keys (step 530=NO), the method 500 continues in step 540. It is assumed that the value of the search key is larger than the value of the largest key 440 (e.g., key 440-32) in the header 411 and thus is in a range of keys defined by the partition (e.g., partition 420-32) having a range of the largest key values. Note that when step 530=NO, in step 540 the largest key 440 (e.g., key 440-32) in the header 411 is selected.

If there are more header keys (e.g., keys 440) in the header 411 (step 530=YES), in step 525 it is determined if the end of the header block (e.g., header block 410) has been reached. If so (step 525=YES), then the next header block (e.g., header block 415) is retrieved and steps 515, 520, and 530 would be performed using the newly retrieved header block. As described in more detail below, having the header 411 split into header blocks 410 and 415 means that, on average, fewer accesses are made to main memory 330.

If the end of the header block 410 has not been reached (step 525=NO), the method 500 continues in step 515. If the header key is greater than the search key (step 520=YES), the previous header key (e.g., a key 420 in header 411) is selected in step 540. Note that when the header key 420-2, $k_2^1$, is greater than the search key, the header key 420-1, $k_1^1$, is chosen in step 540. In step 545, the partition 420 of the node 400 that corresponds to the selected header key is retrieved. In step 550, the retrieved partition 420 is searched for an appropriate header key. Broadly, the header key is selected in the same manner as the header block: it is determined which of the keys 440-447 is larger than the search key, and then the next smaller key 440-447 is chosen as the selected header key.

In step 555, the selected header key is compared with the search key. If the header key is not equal to the search key (step 555=NO), then another node (e.g., one of the nodes 460) is retrieved in step 507. If the header key matches the search key, then the search key and associated record ID has been found in step 560. Note that it might be possible for no match to the search key be found. In this case, the method 500 could include steps to provide for testing and reporting of no match.

Indexing data structures in the HB+-tree 335 should be maintained up-to-date and reflect changes to the underlying data. What is specific to the HB+-tree is the header 411, which should be updated when the keys 440 in the main section 421 of the node 400 are modified. Excluding the header 411, the node 400 is constructed and maintained following the rules of the traditional B+-tree. The following are cases when the header 411 should be modified in the HB+-tree 335:

(1) A key 440, $k_i$, is inserted or deleted from a node 400, and the node 400 does not need to be merged with other nodes 400 or split. The keys 440 following $k_i$ should be re-partitioned and the header 411 should be updated such that keys 440 correspond to the first keys 440 in the new partitions 420.

(2) Following the splitting of a node 400 due to the insertion of one more key 440 over the maximum number of keys 440 allowed, a new node 400 is created. The header 411 in the old node 400 as well as the header 411 in the new node 400 should be updated to reflect the position of the partitions 420.

(3) Following a delete that results in a combination of nodes 400, the header 411 of the resulting combined node 400 should be recalculated.

As discussed above, the size of the header 411 fits in an exemplary embodiment into exactly two cache lines and includes 4n−1 keys. The two cache line-sized portions of the header 411 are header blocks H1 410 and H2 415. The remaining section of the node comprises an equal number of keys and pointers grouped into 4n partitions 420. Each partition 420 is in an exemplary embodiment the size of a cache line (e.g., cache line size L 326).

Figure 6:
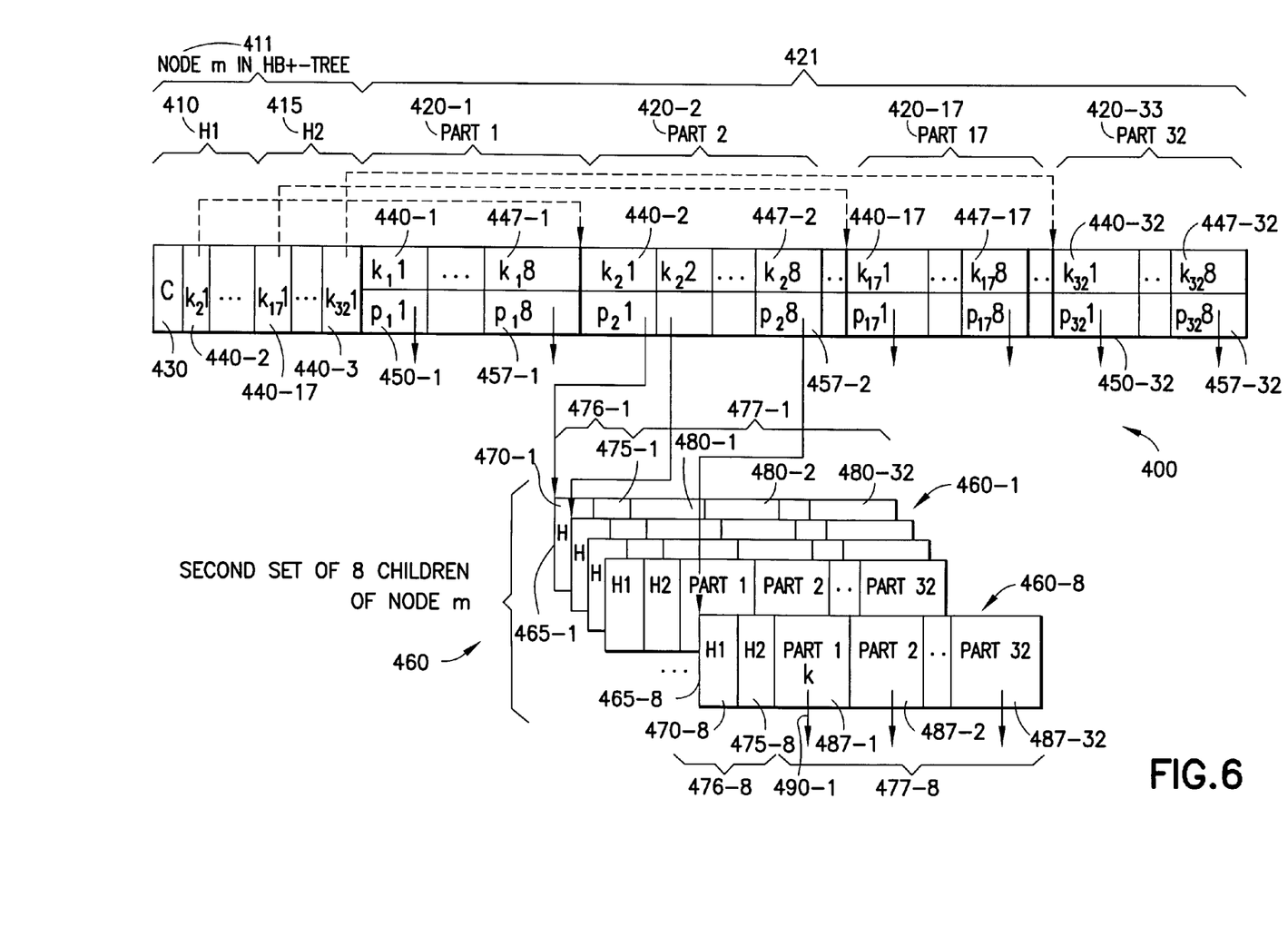
FIG. 6 is the diagram of FIG. 4, used to illustrate key lookup in an HB+-tree.

Consider the example in FIG. 6 of a key lookup search for key k 490-1. Assume key k 490-1 is contained in the subtree pointed to by a pointer 457-2 associated with key 447-2, $k_2^8$. In order to access key 447-2, $k_2^8$, the key lookup starts at the beginning of the header 411. Since key 447-2, $k_2^8$, is in the partition 420-2 that includes key 440-2, $k_2^1$, only the first three keys 440 (e.g., counting the counter 430, C, the key 440-2 and the key 440-3) in the header 411 are compared and only one cache line is accessed so far. From the header 411 (e.g., from header block 410), one can directly jump into the corresponding location in the main section 421, and retrieve the partition 420-2 containing key 440, $k_2^1$, and place the partition 420-2 in a cache line. The matching key 447-2, $k_2^8$, is in the same cache line so retrieval of the key 447-2, $k_2^8$, does not lead to a new main memory 330 access. The next node 440 to be visited starts at the address referenced by the pointer 457-2 associated with key 447-2, $k_2^8$. To summarize, the processing of node m 400 incurred only two main memory 330 accesses.

An advantage of using the specific design shown in FIGS. 4 and 6 for nodes 400 is a guarantee of the number of cache fetches to be two to three. If the search key is matched in the first header block 410 of the header 411, then the number of cache lines fetched is exactly two: the first header block 410 of the header 411 and the corresponding partition 420. Otherwise, the processor fetches exactly three cache lines: two for both of the header blocks 410, 415 of the header 411 and one for the corresponding partition 420. On average, 2.5 cache lines will be accessed from main memory 330 for each node 400 (e.g., if the node 400 is full). So, the total number of cache lines fetched during a search is going to be 2.5 times the number of levels in the tree. Compare this amount of fetched cache lines with a typical scheme as shown in FIGS. 1 or 2, where the average amount of fetched cache lines is larger than 2.5. The benefit in cache line accesses provided by the exemplary embodiment of FIG. 4 over other types of tree-based data index structures occurs for any number of levels. In fact, the savings (e.g., in terms of cache accesses) grow linearly with the number of levels.

3. Exemplary Results

Figure 7:
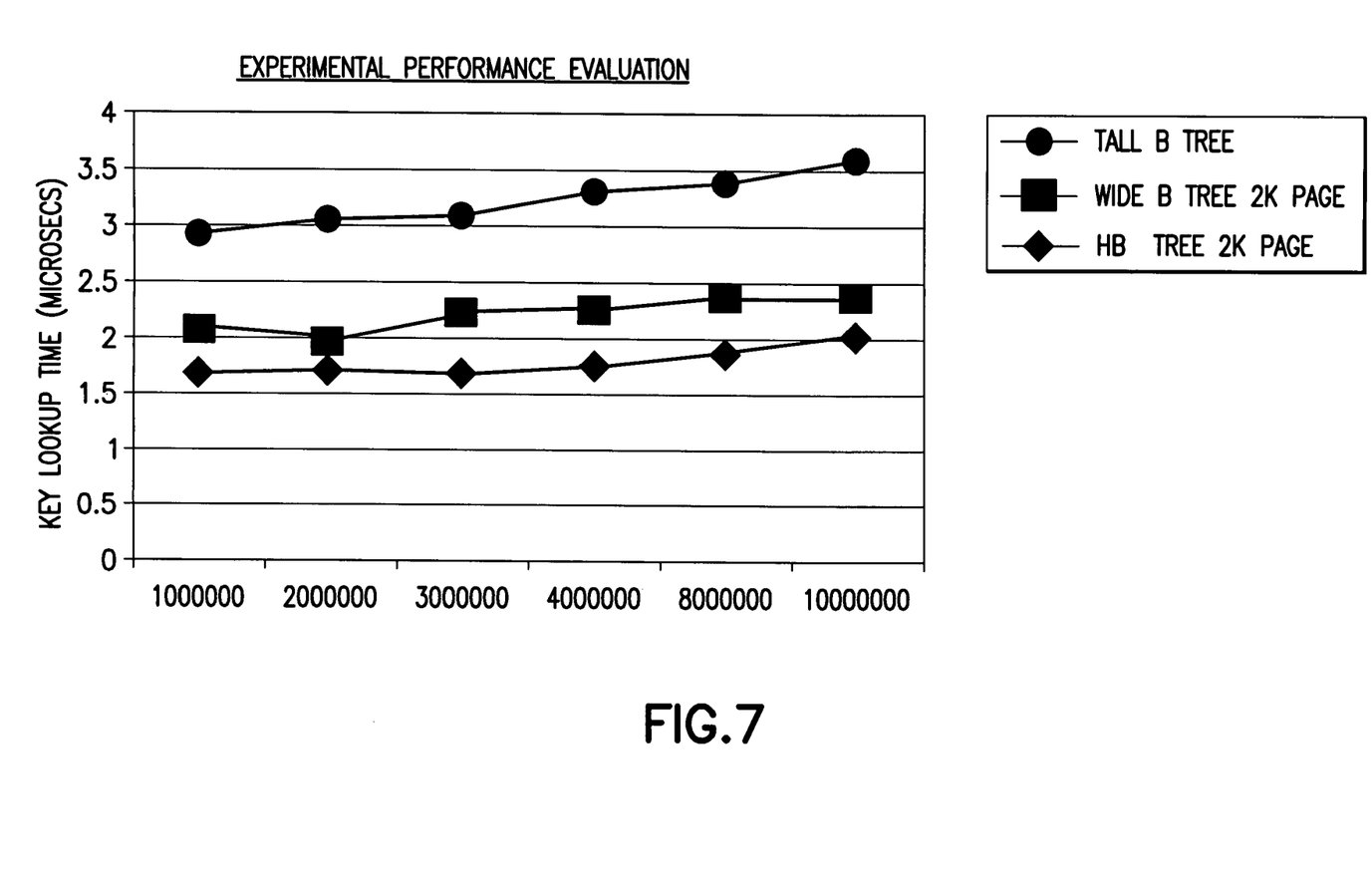
FIG. 7 is an example of experimental performance evaluation comparing performance of the HB+-tree with a tall B+-tree and a wide B-tree.

FIG. 7 summarizes results of an experiment that evaluated the performance of the HB+-tree 335 with 2K page nodes against the tall B+-tree and the wide B+-tree with 2K page nodes. The measured performance gain of the HB+-tree 335 over the tall B+-tree was about 44 percent. Additionally, the results of the experimental evaluation indicate that the HB+-tree 335 outperforms a wide B+-tree with the same number of keys per node by 15-23 percent.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. Nonetheless, all such and similar modifications of the teachings of this invention will still fall within the scope of this invention.

Furthermore, some of the features of the exemplary embodiments of this invention could be used to advantage without the corresponding use of other features. As such, the foregoing description should be considered as merely illustrative of the principles of the present invention, and not in limitation thereof.

What is claimed is:

1. A computer-implemented method for performing key lookups, comprising:

accessing a header of a given one of a plurality of nodes in a tree-based data index structure, the given node comprising the header and a plurality of partitions, each partition comprising at least one partition key, and the header of the given node comprising a plurality of header keys comprising at least one partition key from each of all but one partition of the plurality of partitions;

choosing, using a search key, a chosen header key in the header;

accessing a partition corresponding to the chosen header key; and selecting, using the search key, one of the at least one partition keys in the accessed partition, wherein the selected one of the at least one partition keys is used to access another of the plurality of nodes, wherein a partition key comprises information corresponding to a record;
wherein the plurality of partitions comprises a predetermined number of positions, and the header further comprises a counter indicating how many of the predetermined number of positions are filled.

2. The method of claim 1, wherein:
the header is divided into a plurality of blocks, each block having a size equivalent to a cache line size; and
each of the partitions has a size equivalent to a cache line size.

3. The method of claim 2, wherein the header is divided into two blocks.

4. The method of claim 1, wherein each of the plurality of nodes comprises a header and a plurality of partitions, each partition comprising at least one partition key, the header of each of the nodes comprising a plurality of header keys comprising at least one partition key from each of a selected plurality of partitions of a corresponding node.

5. The method of claim 1, wherein the header and plurality of partitions are stored in contiguous locations in a main memory.

6. The method of claim 1, wherein:
the partition keys in all of the partitions in the given node are sorted in a numeric order;
each partition is sized to contain a predetermined number of positions, each position comprising a single partition key; and
each header key in the header corresponds to a selected one of the positions for a corresponding partition and comprises a partition key from that selected position in the corresponding partition.

7. The method of claim 1, wherein:
the partition keys in all of the partitions in the given node are sorted in an ascending numeric order;
choosing further comprises choosing a selected key in the header by determining that the search key is less than a value of one of the header keys in the header and by choosing a header key in the header having a value less than but nearest to the one header key.

8. The method of claim 1, wherein:
the partition keys in all of the partitions in the given node are sorted in descending numeric order; and
choosing further comprises choosing a header key in the header by determining that the search key is greater than a value of one of the header keys in the header and by choosing a header key in the header having a value greater than but nearest to the one selected key.

9. The method of claim 1, where each partition further comprises at least one pointer, where each partition key is associated with a pointer.

10. The method of claim 1, where accessing the another of the plurality of nodes comprises fetching the another of the plurality of nodes from main memory.

11. The method of claim 10, where fetching comprises storing the another of the plurality of nodes in a cache.

12. The method of claim 11, where the cache is a write-through cache.

13. The method of claim 11, where accessing the cache is faster than accessing the main memory.

* * * * *